(12) United States Patent
Mao

(10) Patent No.: US 9,503,552 B2
(45) Date of Patent: Nov. 22, 2016

(54) SYSTEM AND METHOD FOR ADAPTING TO NETWORK PROTOCOL UPDATES

(71) Applicant: Google Inc., Mountain View, CA (US)

(72) Inventor: Yuhong Mao, Fremont, CA (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 14/273,953

(22) Filed: May 9, 2014

(65) Prior Publication Data

US 2015/0326696 A1    Nov. 12, 2015

(51) Int. Cl.
*H04L 29/06* (2006.01)
*H04L 12/723* (2013.01)

(52) U.S. Cl.
CPC ............... *H04L 69/22* (2013.01); *H04L 45/50* (2013.01); *H04L 69/08* (2013.01)

(58) Field of Classification Search
CPC ........ H04L 69/22; H04L 45/50; H04L 69/08
USPC .......................... 370/401, 466, 389, 352, 392
See application file for complete search history.

(56) References Cited

U.S. PATENT DOCUMENTS

| | | | |
|---|---|---|---|
| 5,802,287 A | 9/1998 | Rostoker et al. | |
| 6,901,052 B2 | 5/2005 | Buskirk et al. | |
| 6,944,168 B2 | 9/2005 | Paatela et al. | |
| 6,975,628 B2 | 12/2005 | Johnson et al. | |
| 8,705,524 B1 * | 4/2014 | Kelly | H04L 29/0653 370/387 |
| 2001/0033580 A1 | 10/2001 | Dorsey et al. | |
| 2001/0046229 A1 * | 11/2001 | Clear | H04L 69/22 370/389 |
| 2002/0163935 A1 * | 11/2002 | Paatela | H04L 29/06 370/466 |
| 2005/0198336 A1 * | 9/2005 | Eytchison | H04L 69/32 709/230 |
| 2011/0142063 A1 * | 6/2011 | Kasturi | H04L 69/18 370/401 |
| 2014/0153563 A1 * | 6/2014 | Hlibiciuc | H04M 7/0093 370/352 |
| 2015/0149651 A1 * | 5/2015 | Yasukawa | H04L 12/2809 709/230 |

FOREIGN PATENT DOCUMENTS

EP    1158724 A2    11/2001

OTHER PUBLICATIONS

Khosravi et al., "Requirements for Separation of IP Control and Forwarding", Nov. 2006.
Soviani, Cristian, "HIgh Level Synthesis for Packet Processing Pipelines", Columbia University, 151 pages 2007.
International Search Report and Written Opinion for Application No. PCT/US2015/029736 dated Aug. 19, 2015.

* cited by examiner

*Primary Examiner* — Anh Ngoc Nguyen
*Assistant Examiner* — Syed M Bokhari
(74) *Attorney, Agent, or Firm* — Lerner, David, Littenberg, Krumholz & Mentlik, LLP

(57) ABSTRACT

A system and method are provided for updating network protocols. A new ASIC is designed to adapt to future network protocols, the ASIC including at least one packet editing program. The ASIC is configured to classify a received packet to determine new protocols to which the packet is to be updated, delete selected existing headers of the packet, insert new headers in the packet based on the classification, and modify selected headers based on the classification.

21 Claims, 8 Drawing Sheets

| Bytes 0:7 | Bytes 8:15 | Bytes 16:31 |
|---|---|---|
| Delete Instructions | Insert Instructions | Modify Instructions |

Fig. 3A

| Bytes 0:7 | Bytes 8:31 | Bytes 32:63 |
|---|---|---|
| Delete Instructions | Insert Instructions | Modify Instructions |

```
            INS MOV
 7   6   5   4   3   2   1   0
+---+---+---+---+---+---+---+---+
| 0   0 |          cnt          |
+---+---+---+---+---+---+---+---+
```

Fig. 5B

```
           INS STATIC
 7   6   5   4   3   2   1   0
+---+---+---+---+---+---+---+---+
| 0   1   0 | h |     cnt       |
+---+---+---+---+---+---+---+---+
```

Fig. 5C

```
           INS SHARED
 7   6   5   4   3   2   1   0
+---+---+---+---+---+---+---+---+
| 0   1   1 | h |     cnt       |
+---+---+---+---+---+---+---+---+
```

Fig. 5D

```
          INS DYNAMIC L
 7   6   5   4   3   2   1   0
+---+---+---+---+---+---+---+---+
| 1   0   0 | h |     cnt       |
+---+---+---+---+---+---+---+---+
```

Fig. 5E

```
          INS DYNAMIC H
 7   6   5   4   3   2   1   0
+---+---+---+---+---+---+---+---+
| 1   0   1 | h |     cnt       |
+---+---+---+---+---+---+---+---+
```

Fig. 5F

```
            INS REG
 7   6   5   4   3   2   1   0
+---+---+---+---+---+---+---+---+
| 1   1   1 |  sel  |    cnt    |
+---+---+---+---+---+---+---+---+
```

Fig. 6A

MOD WRITE META

```
 15  14  13  12  11  10   9   8   7   6   5   4   3   2   1   0
+---+---+---+---+---+---+---+---+---+---+---+---+---+---+---+---+
| 0   0   0 |    sel    |    op_code    |          offset       |
+---+---+---+---+---+---+---+---+---+---+---+---+---+---+---+---+
```

Fig. 6B

MOD CHKSUM

```
 15  14  13  12  11  10   9   8   7   6   5   4   3   2   1   0
+---+---+---+---+---+---+---+---+---+---+---+---+---+---+---+---+
| 0   0   1 | csum_offset |    hdr_len    |     hdr_offset      |
+---+---+---+---+---+---+---+---+---+---+---+---+---+---+---+---+
```

Fig. 6C

MOD ALU

```
 15  14  13  12  11  10   9   8   7   6   5   4   3   2   1   0
+---+---+---+---+---+---+---+---+---+---+---+---+---+---+---+---+
| 0   1   0   0   0 | ben |    op_code    |       offset        |
+---+---+---+---+---+---+---+---+---+---+---+---+---+---+---+---+
```

Fig. 6D

MOD CHKSUM INC

```
 15  14  13  12  11  10   9   8   7   6   5   4   3   2   1   0
+---+---+---+---+---+---+---+---+---+---+---+---+---+---+---+---+
| 1   0   0   0   0   0   0   0   0   0 |     csum_offset       |
+---+---+---+---+---+---+---+---+---+---+---+---+---+---+---+---+
|                             imm_data                          |
+---+---+---+---+---+---+---+---+---+---+---+---+---+---+---+---+
```

Fig. 6E

MOD WRITE IMM

```
 15  14  13  12  11  10   9   8   7   6   5   4   3   2   1   0
+---+---+---+---+---+---+---+---+---+---+---+---+---+---+---+---+
| 1   0   0   0   0   0 |    nibble_en    |       offset        |
+---+---+---+---+---+---+---+---+---+---+---+---+---+---+---+---+
|                             imm_data                          |
+---+---+---+---+---+---+---+---+---+---+---+---+---+---+---+---+
```

Fig. 6F

MOD WRITE META IMM

```
 15  14  13  12  11  10   9   8   7   6   5   4   3   2   1   0
+---+---+---+---+---+---+---+---+---+---+---+---+---+---+---+---+
| 1   0   1 |    sel    |    op_code    |        offset         |
+---+---+---+---+---+---+---+---+---+---+---+---+---+---+---+---+
|                             imm_data                          |
+---+---+---+---+---+---+---+---+---+---+---+---+---+---+---+---+
```

SYSTEM AND METHOD FOR ADAPTING TO NETWORK PROTOCOL UPDATES

BACKGROUND

Most networking application specific integrated circuits (ASICs) implement a small and fixed set of packet header editing capabilities for predefined network protocols. Examples of such header editing capabilities for particular network protocols include generic routing encapsulation (GRE) tunnel encapsulation and decapsulation, virtual local area network/multiprotocol label switching (VLAN/MPLS) tag push/pop, etc. New network protocols require either a respin or a complete redesign of the ASIC, which is both costly and time consuming. For example, redesigning and replacing the ASICs in a network can take several years and cost millions of dollars.

SUMMARY

A system and method is provided for expediently updating network protocols. An ASIC adaptable to future network protocols includes a Protocol Independent Packet Editor (PIPE), which may be programmed to support packet header editing requirements of current and possible future network protocols.

One aspect of the technology provides a method, comprising receiving a packet, classifying, with one or more processors, the packet, the classification including determining a new protocol to which the packet is to be updated, deleting, with one or more processors, an existing header of the packet, inserting, with one or more processors, a new header in the packet based on the classification, and modifying, with one or more processors, the new header based on the classification. According to some examples, determining the new protocol to which the packet is to be updated comprises identifying pointers to a packet editing program. Deleting the existing packet header may include deleting selected portions of the existing header that are not used by the new protocol. Moreover, inserting the new packet header may include inserting portions of the new packet header based on the new protocol and portions remaining from a previous packet header. The packet including the new header may be transmitted through a network based on the new header.

Another aspect of the disclosure provides a system, comprising at least one memory and at least one processor in communication with the at least one memory. The at least processor is configured to receive a packet, classify the packet, the classification including determining a new protocol to which the packet is to be updated, delete an existing header of the packet, insert a new header in the packet based on the classification, and modify the new header based on the classification.

The at least one memory may include at least one packet editing program, each packet editing program including pointers to its editing instructions and pointers to sets of static data, shared data, and dynamic data. The at least one memory may further include meta data and register data accessible by the editing instructions. Moreover, the at least one memory and the at least one processor may reside on an application specific integrated circuit (ASIC).

Yet another aspect of the disclosure provides a non-transitory computer-readable medium storing instructions executable by one or more processors for performing a method, the method comprising receiving a packet, classifying the packet, the classification including determining a new protocol to which the packet is to be updated, deleting an existing header of the packet, inserting a new header in the packet based on the classification, and modifying the new header based on the classification.

BRIEF DESCRIPTION OF THE DRAWINGS

FIGS. 3A-B illustrate example instruction formats according to aspects of the disclosure.

FIGS. 5A-F illustrate example instructions according to aspects of the disclosure.

FIG. 6A-F illustrate example instructions according to aspects of the disclosure.

DETAILED DESCRIPTION

This disclosure provides a system and method for expediently updating network protocols. Rather than redesigning and replacing application specific integrated circuits (ASICs) when a network protocol is updated, a new ASIC is designed to adapt to future network protocols. The ASIC includes a Protocol Independent Packet Editor (PIPE) which may be programmed to support packet header editing requirements of current and possible future network protocols.

According to one embodiment, the ASIC includes a Central Editing Unit (CEU) that executes an editing program to operate on the packet header. The Central Editing Unit is a processing pipeline of three distinct editing units: a Deletion Unit, an Insertion Unit, and a Modification Unit. Each unit operates on a packet modified from the previous unit. This CEU pipeline enables flexible packet header editing at high bandwidth and packet rate with efficient hardware implementation in silicon.

The Deletion Unit enables the removal of arbitrary protocol headers from the packet. The Insertion Unit enables the insertion of arbitrary protocol headers into the packet. The Modification Unit enables flexible rewriting (either overwrite, or read-modify-write) of header fields.

The packet editing program executed by the CEU includes a set of editing instructions (deletion, insertion, and field modification), and a set of editing data (configuration, meta, shared, and dynamic). One or more different editing programs may exist for different packet header editing capabilities, such as encapsulation, decapsulation, encryption, decryption, etc. A logic unit parses and classifies the incoming packet to determine pointers to program instructions and the associated data set.

The editing instructions may be, for example, 32 bytes or 64 byte in length. Editing instructions can be shared by the different editing programs for different network operations. Each editing program may include pointers to three sets of data: Static Data; Shared Data (e.g., the [flowID,pkt_cnt, encryption key] of a security flow state that is shared among different packet editing programs); and Dynamic Data (e.g.

dedicated data to the program). In addition, there are two sets of global data available to the editing instructions: Meta Data, and Regular Data.

Figure 1:
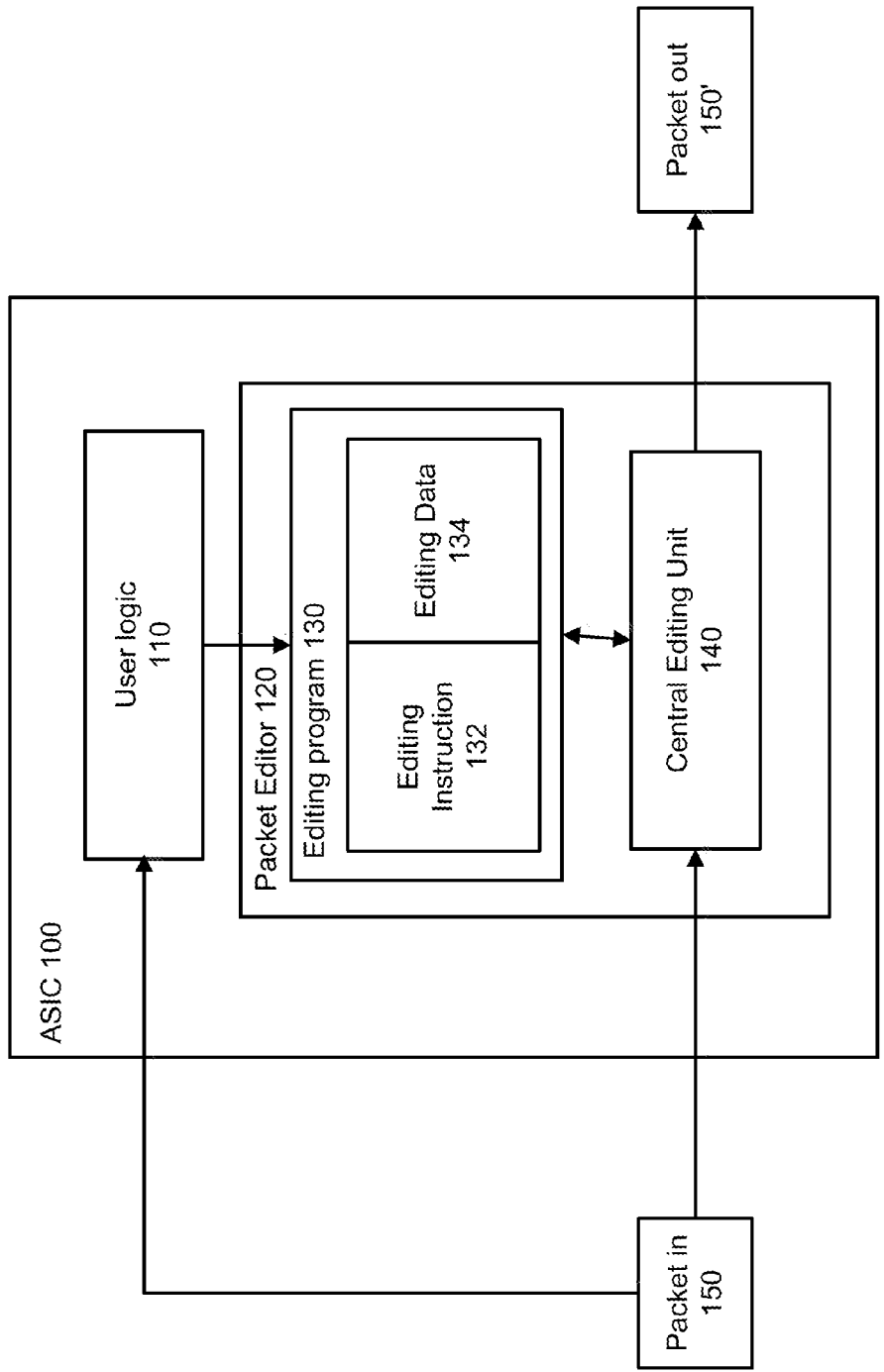
FIG. 1 is a system diagram according to an aspect of the disclosure.

FIG. 1 illustrates an ASIC 100 according to aspects of the disclosure. The ASIC 100 is adapted to receive a packet, such as the packet 150, and update the packet in accordance with an updated network protocol. According to some examples, the updated network protocol may be a future network protocol that is not currently developed. In this regard, rather than replacing each ASIC in a network each time a protocol is updated, the ASIC and packets transmitted through the network may be efficiently updated.

The ASIC 100 may be any of a number of ASICs interconnected in a network. According to another example, the ASIC may be designated for protocol updates. While the ASIC 100 is described as having particular components, it should be understood that other components, such as those typically found in an ASIC, may be included. Moreover, while the components are shown as residing within the ASIC 100, it should be understood that the components may reside elsewhere in the network in communication with the ASIC 100.

The ASIC 100 includes user logic 110 and a packet editor 120. The packet editor 120 further includes at least one editing program 130, including editing instructions 132 and editing data 134, and a central editing unit 140.

The user logic 110 parses packets received in the ASIC and classifies the packets. For example, the user logic 110 may determine which of a number of editing programs should operate on the packet 150. Different editing programs may be created to update different types of packets. For example, a first editing program may be used to update a packet from a first protocol to a new protocol, while a second editing program is used to update a packet from a second protocol to the new protocol. According to another example, a third editing program may be used to update encapsulated packets, while a third editing program is used to update decapsulated packets.

Each editing program includes editing data and editing instructions. For example, the editing program 130 includes editing instructions 132 and editing data 134. Further details of the editing program are described below with respect to FIG. 4.

The central editing unit 140 is a processing pipeline which updates the packet 150 according to the editing program identified by the user logic 110. Accordingly, the ASIC 100 can send updated packet 150' through the network.

Figure 2:
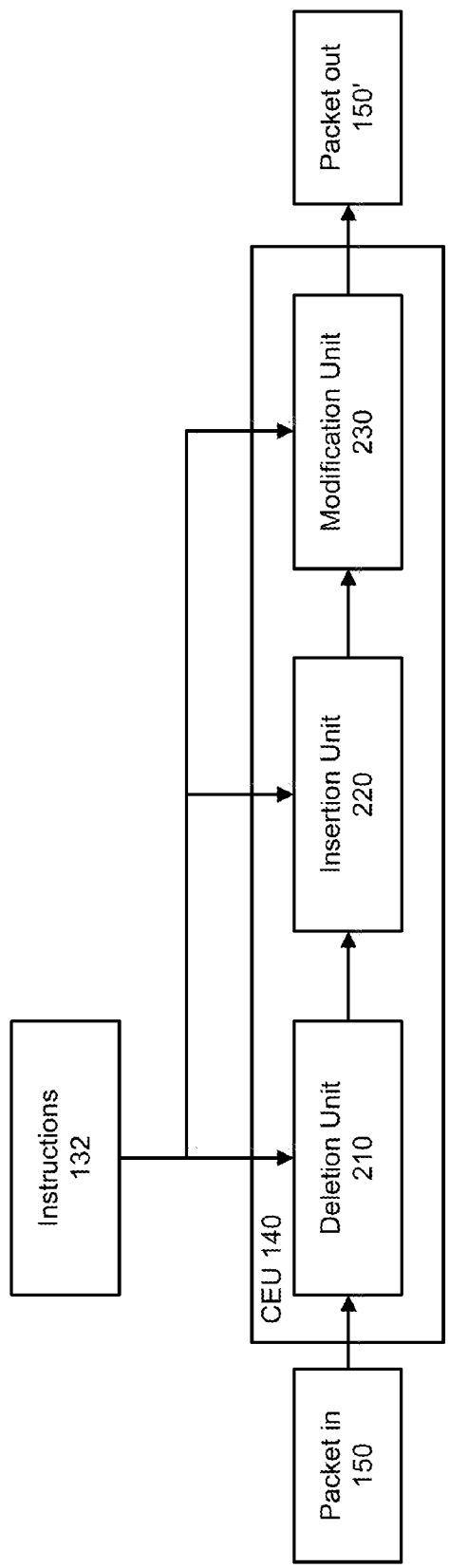
FIG. 2 is another system diagram according to aspects of the disclosure.

FIG. 2 illustrates further details of the central editing unit 140. As shown, the central editing unit 140 includes a deletion unit 210, an insertion unit 220, and a modification unit 230. Each of these units 210, 220, 230 operates on the incoming packet 150 in accordance with a set of instructions for a particular editing program, such as the instructions 132. As discussed below with respect to FIG. 4, the instructions 132 may include a separate set of instructions for each unit 210, 220, 230. The insertion unit 220 operates on the packet 150 after the packet has been modified by the deletion unit 210. Similarly, the modification unit 230 operates on the packet after the packet has been modified by the insertion unit 220. Each unit may realign a byte stream for the packet after its operation and before passing the packet to the next unit. This central editing unit pipeline enables flexible packet header editing at high bandwidth and packet rate. Moreover, the pipeline provides for efficient hardware implementation in silicon.

The deletion unit 210 enables the removal of arbitrary protocol headers from the packet. For example, for packets including multiple headers, such as an inner IP header and an outer IP header in a tunneled network, the deletion unit 210 may remove all packet headers or selected packet headers. According to another example, the deletion unit 210 may delete particular fields of packet, while keeping others that are relevant to the updated network protocol.

The insertion unit 220 enables the insertion of arbitrary protocol headers into the packet. For example, the insertion unit 220 may generate a new set of header fields related to the update network protocol and add these generated fields to the packet 150. In the example where only particular fields are deleted by the deletion unit 210, the insertion unit 220 may determine that the remaining fields do not need to be regenerated, and instead only generate the needed fields. In other examples, the insertion unit 220 may generate the header in its entirety.

The modification unit 230 enables flexible rewriting, such as overwrite or read-modify-write, of header fields. For example, the modification unit 230 may fill the packet header fields with information enabling the packet to be appropriately transmitted through the updated network.

As discussed above in connection with FIG. 1, each packet editing program includes editing instructions and an editing data set. For example, a program may have a 16-bit pointer to its editing instructions. According to some examples, editing instructions can be shared by different editing programs. For example, encapsulation under a first network protocol and encapsulation under a second network protocol may utilize the same editing instructions.

FIGS. 3A and 3B illustrate example formats of the editing instructions. In the example of FIG. 3A, the instructions are 32B. Bytes 0-7 are dedicated to deletion, bytes 8-15 are dedicated to insertion, and bytes 16-31 are dedicated to modification. In the example of FIG. 3B, the instructions are 64B. Here, similar to the 32B format, bytes 0-7 are dedicated to deletion. However, in contrast to the 32B format, bytes 8-31 are dedicated to insertion in the 64B format, and bytes 32-63 are dedicated to modification.

Figure 4:
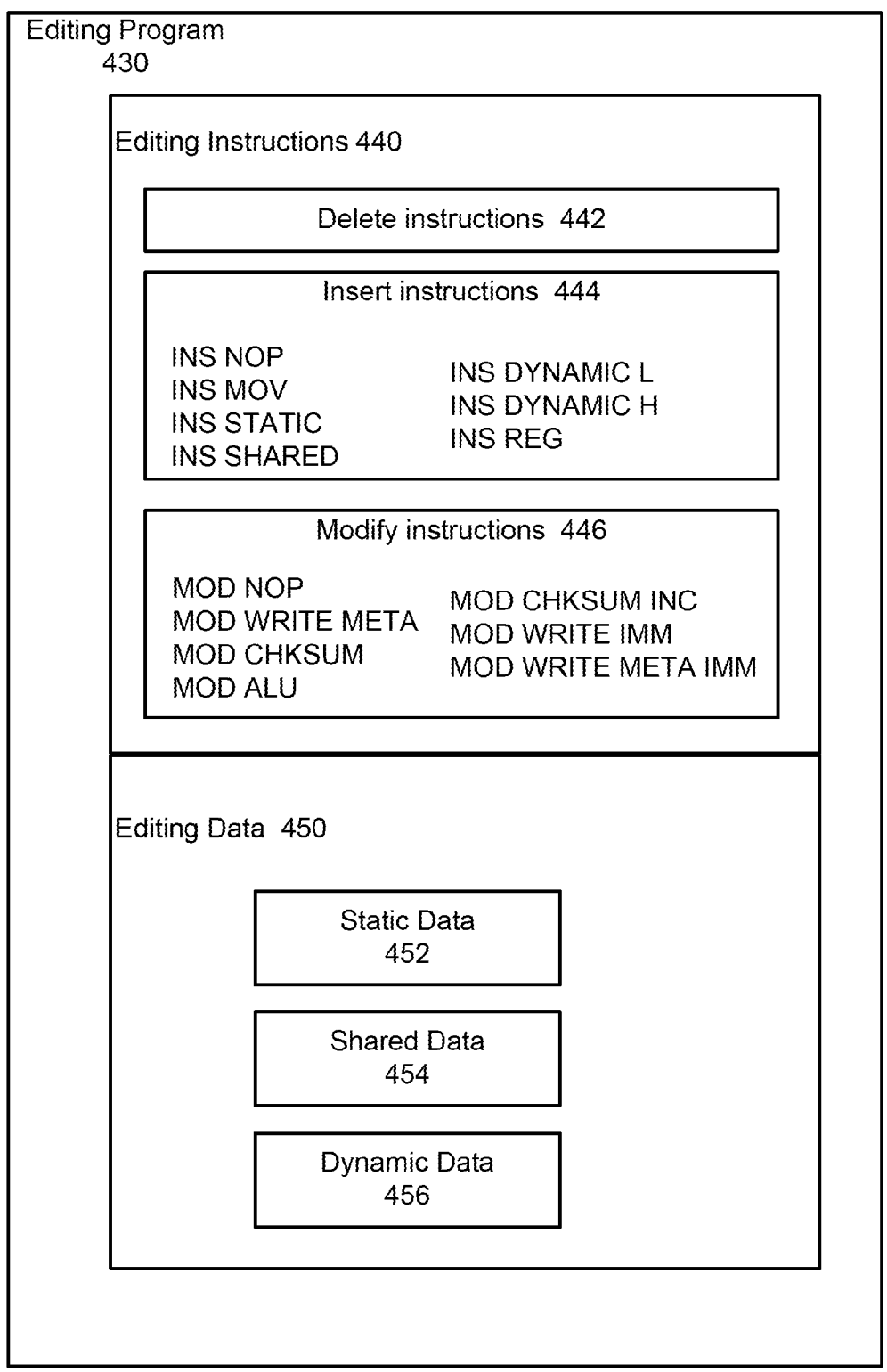
FIG. 4 is another system diagram according to aspects of the disclosure.

FIG. 4 provides a more detailed illustration of an editing program 430. The editing program 430 includes editing instructions 440 and editing data 450.

Editing data 450 includes static data 452, shared data 454, and dynamic data 456. For example, each editing program may include pointers to these data sets, which may be stored in a memory in communication with the ASIC. According to one example, the static data 452 and shared data 454 may each be 32B, and the dynamic data 456 may be 32B-64B of data dedicated to the particular editing program. According to one example, multipath load balancing can be supported by selecting the shared/dynamic data sets from a group of shared/dynamic data sets with a hash generated from selected n-tuple header fields.

Though not shown, additional data may be available to the editing instructions, such as meta data and register data. For example, 32B of meta data may be available, in which the first 8×2B halfword are metadata, such as pkt_length, ip_pkt_id, flow_hash, slice_ID, etc. The second 8×2B halfwords are 2B header fields collected from the packet header, e.g. IP_PROTO, TTL, TOS etc. For example, through the parsing of the user logic, the packet format is identified and 8×2B offsets are specified to select the desired header fields. As another example, 64B of register data may be available to the editing instructions, with 8×8B registers. In this example, Register 0 is hardcoded to all zeros; Register 1 is optionally loaded with 64 bit packet count; Register 2 is optionally loaded with 64 bit timestamp; and Registers 3-7 are configured by software with static data.

Editing instructions 440 include delete instruction 442, insert instruction 444, and modify instructions 446. Examples of particular insert instructions 444 are shown, such as <INS NOP> and <INS MOV>, and described in further detail in FIGS. 5A-5F. Examples of particular modify instructions 446, such as <MOD NOP> and <MOD WRITE META>, are also shown and described in further detail in FIGS. 6A-6F.

Delete instructions 442 may be, for example, 8B in length, with each bit representing a 2B halfword of a 128B packet header. When a bit is set, the corresponding 2B halfword is deleted from the packet header. A 64 bit zero is effectively a no operation (NOP) deletion instruction.

Insert instructions 444 may be executed by, for example, the insertion unit 220 of FIG. 2. According to one example, the insertion unit 220 maintains an active header pointer (e.g., in units of 2B halfwords) which starts at zero. A MOV instruction, described in further detail below with respect to FIG. 5A, moves the header pointer forward. The insert instruction inserts the specified data at the current active header pointer, and moves the header pointer forward by the number of halfwords inserted. All insert instructions 444 may be, for example, 8 bit wide.

FIGS. 5A-5F illustrate example insert instructions 444, including move, and operations on particular data sets. Not shown is a no operation insertion instruction. For example, 8 bits of zeros is a NOP, indicating the end of the insertion instructions.

FIG. 5A illustrates an example INS MOV instruction. This instruction advances a current insertion pointer by a specified count (cnt). For example, as shown, bits 0-5 include the count, while bits 7-8 are set to 0.

FIG. 5B illustrates an example INS STATIC instruction. This instruction inserts specified (cnt) halfwords from the Static Data Set (e.g., static data 452 of FIG. 4). If h=0, the data starts from the lower 16B. If h=1, the data starts from the upper 16B.

FIG. 5C illustrates an example INS SHARED instruction. This instruction may operate on the shared data set (e.g., shared data 454 of FIG. 4) the same way that the INS STATIC instruction operates on the static data set. Similarly, FIG. 5D illustrates an example INS DYNAMIC L instructions that also operates the same way on a first 32B of dynamic data, such as the dynamic data 456 of FIG. 4. Further, FIG. 5E illustrates an example INS DYNAMIC H instructions, which also operates the same way on the second 32B of dynamic data.

FIG. 5F illustrates an example INS REG instruction, which inserts cnt halfwords from selected global register data.

Modify instructions 446 may generally operate on a halfword, with optional bits or bytes selected in some instructions. According to some example, two modify instructions may operate on same halfword, each operating on a different byte. MOD NOP indicates a no operation modification instruction, and may be represented by 16 bits of 0. This indicates the end of the modify instructions.

FIG. 6A illustrates an example MOD WRITE META instruction. According to this instruction, a write operation is performed at the offset (in unit of halfwords) with the selected (sel[3:0]) 2B field from the Meta Data set, according to the specified op_code. Examples of supported write op_code rewriting 4 nibbles of metadata include: 1. ABCD>ABCD; 2. ABCD>ABXX; 3. ABCD>XXCD; 4. ABCD>XXAB; 5. ABCD>CDXX; 6. ABCD>XCDX; 7. ABCD>XXBC. In these examples, "X" indicates that the nibble is not changed. Examples 6 and 7 may be usefully, for example, in copying DSCP/ECN between IPv4 and IPv6 headers.

FIG. 6B illustrates an example MOD_CHKSUM instruction. This instruction computes the 1's complement checksum (as in IPv4 header) starting at hdr_offset (within the first 64B of the header), for hdr_len halfwords, and writes the computed checksum field at the specified csum_offset location relative to the hdr_offset field. The checksum field itself is not included in the checksum accumulation.

FIG. 6C illustrates an example MOD_ALU instruction, which executes operations specified by the op_code, for the byte/halfword (specified by byte enable "ben") at the header offset. Examples of supported op_code include: 0—set to zero; 1—set to 1; 2—add 1; 3—add 1 but stops at 8 hF or 16 hFF; 4—subtract 1; 5—subtract 1 but stops at zero.

FIG. 6D illustrates an example MOD_CKSUM_INC instruction, which performs an incremental checksum update of the checksum field at csum_offset, with the incremental value specified in imm_data.

FIG. 6E illustrates an example MOD_WRITE_IMM instruction, which overwrites the header field at offset with the 16 bit immediate data imm_data. Each bit of the nibble_en enables one nibble in the halfword to be overwritten.

FIG. 6F illustrates an example MOD_WRITE_META_IMM instruction, which writes at the offset (in unit of halfwords) with the result of operations (specified by the op_code) between the imm_data and the selected (sel[3:0]) 2B field from the Meta Data. Examples of supported op_code include: 0—Add; 1—Bitwide OR; 2—Bitwide AND.

While a number of example instructions have been explained, it should be understood that these examples are not exhaustive, and that additional instructions may be used to update the packet headers. Moreover, it should be understood that these example instructions may be modified while still achieving the intended effect.

Figure 7:
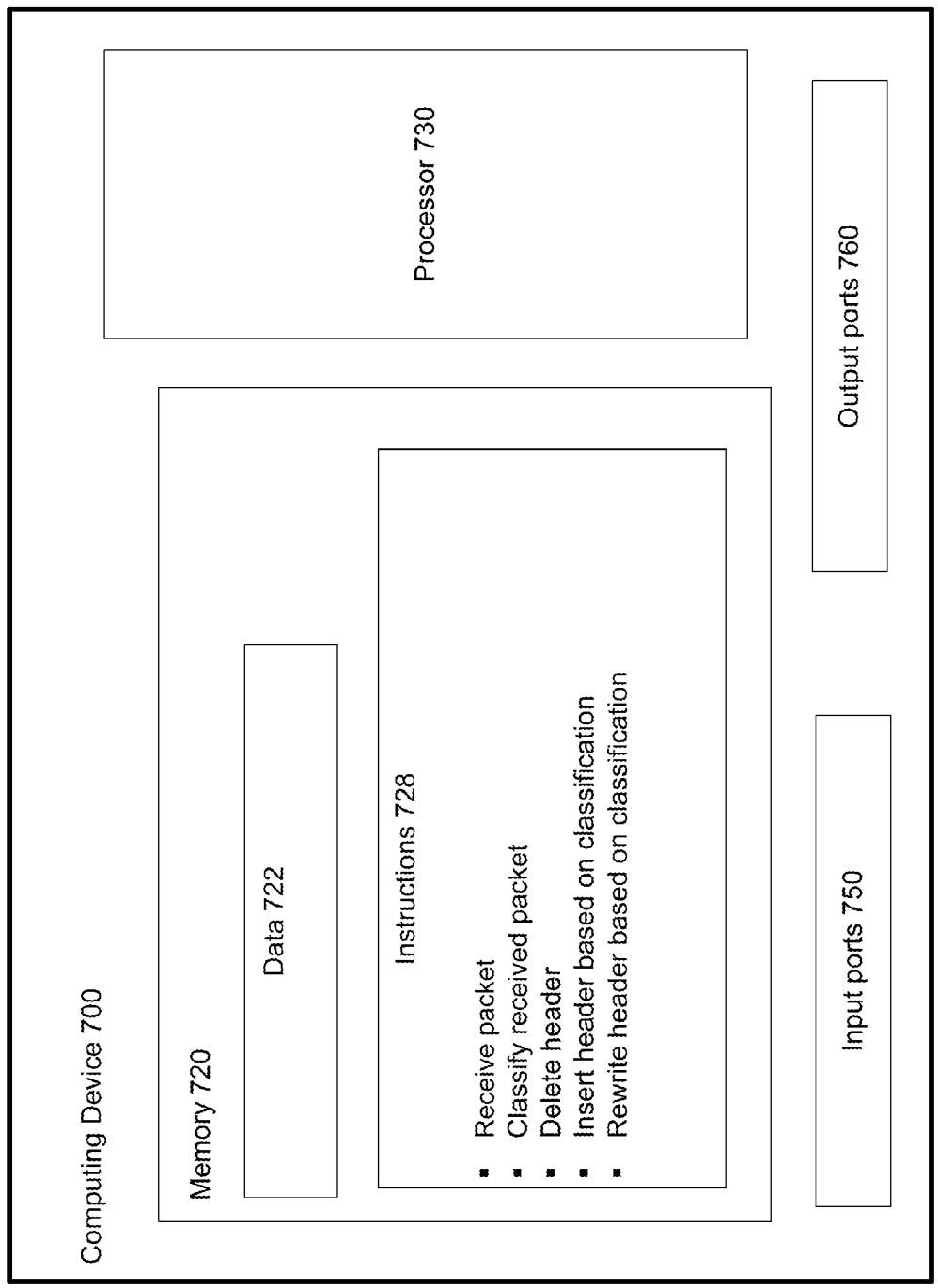
FIG. 7 is another system diagram according to aspects of the disclosure.

FIG. 7 illustrates an example computing device which may be implemented to update the packet headers as described herein. The computing device may be an ASIC or other device, or multiple computing devices or components in communication with each other, including a processor 730 and a memory 720. The computing device 700 may further include one or more input ports 750 for receiving data packets or other information from other computing devices. Similarly, the computing device 700 may have one or more output ports 760 for transmitting packets, for example, after the packet headers have been updated according to the new network protocol.

The memory 720 stores information accessible by processor 730, including instructions 728, and data 722 that may be executed or otherwise used by the processor 730. The memory 720 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. According to one example, referring back to FIG. 4, the editing data 450 and editing instructions 440 may share a single logic SRAM, enabling dynamic allocation of SRAM resources among them. Systems and methods may include different combinations of the foregoing, whereby different portions of the instructions and data are stored on different types of media.

The instructions 728 may be any set of instructions to be executed directly (such as machine code) or indirectly (such as scripts) by the processor 730. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Upon receipt of a packet, the processor 730 may execute the instructions 728 to, for example, classify the packet, delete the packet header, insert a new packet header based on the classification, and modify the packet header based on the classification.

The data 722 may be retrieved, stored or modified by processor 730 in accordance with the instructions 728. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 730 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computing device 700 may communicate with other computing devices, for example, over a network. For example, the devices may communicate via a wired connection or wirelessly. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Figure 8:
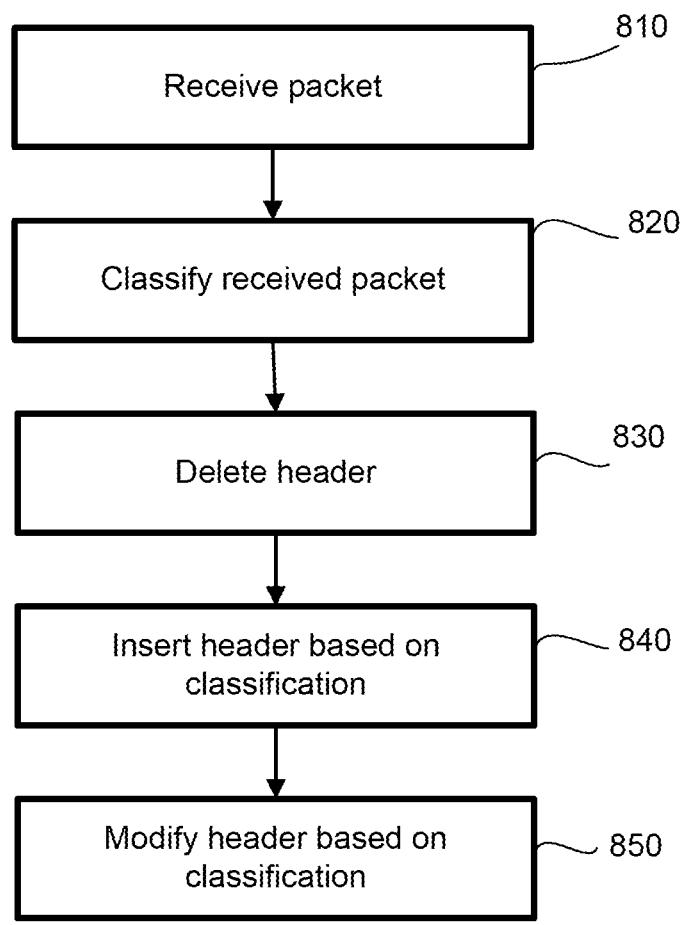
FIG. 8 is a flow diagram of an example method according to aspects of the disclosure.

FIG. 8 illustrates an example method of updating packets to comply with a new network protocol. For example, this method may be performed by a computing device, such as the computing device described above. It should be understood that the operations involved in this method need not be performed in the precise order described. Rather, various operations may be handled in a different order or simultaneously, and operations may be added or omitted.

In block 810, a packet is received. In block 820, the received packet is classified. For example, classification may include determining a format of the received packet and determining a new protocol in accordance with which the received packet should be updated. According to one example, classification includes determining whether the received packet includes pointers to a particular packet editing program and associated data set.

In block 830, the packet header is deleted. For example, the header may be deleted in its entirety, or deleted in part based on the new protocol header format.

In block 840, a new protocol header is inserted based on the classification. For example, the new header may be inserted in whole or in part, based on the deletion. The header may be inserted using, for example, any of the operations described above in connection with FIGS. 4 and 5A-F.

In block 850, the header may be modified. For example, the new header fields may be written and/or existing header fields may be overwritten or modified. Modification of the header fields may be performed using, for example, any of the instructions described above in connection with FIGS. 4 and 6A-F. Once the packet header is modified, the updated packet may be output, for example, through an output port of the computing device.

The systems, methods, and examples described above are advantageous in that they provide for adapting existing networks to new protocols that have not yet been defined. Rather than redesigning and replacing numerous ASICs each time a protocol update is to take place, packet headers may be modified for use by the existing ASICs. In this regard, substantial time, effort, and cost are saved.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising: receiving, with one or more processors, a packet; classifying the packet, the classification comprising: determining, with a user logic unit, a newly developed protocol to which the packet is to be updated, wherein the newly developed protocol is a protocol which was not yet defined at the time the one or more processors were developed; and determining, with the user logic unit, which of a number of packet editing programs to operate on the packet to update the packet to the newly developed protocol; updating, with a central editing unit, the packet, the updating comprising: deleting, with a deletion unit, an existing header of the packet; inserting, with an insertion unit, a new header in the packet according to the determined packet editing program based on the classification, the new header being related to the newly developed protocol; and modifying, with a modification unit, the new header according to the determined packet editing program based on the classification.

2. The method of claim 1, wherein determining the newly developed protocol to which the packet is to be updated comprises identifying pointers to the packet editing program to update the packet.

3. The method of claim 1, wherein deleting the existing packet header comprises deleting selected portions of the existing header that are not used by the newly developed protocol.

4. The method of claim 3, wherein inserting the new packet header comprises inserting portions of the new packet header based on the newly developed protocol and portions remaining from a previous packet header.

5. The method of claim 1, wherein modifying the new packet header comprises executing at least one of an overwrite or a read-modify-write operation.

6. The method of claim 1, further comprising transmitting the packet including the new header through a network based on the new header.

7. A system, comprising: at least one memory including a number of packet editing programs; and at least one processor in communication with the at least one memory, the at least processor to: receive a packet; classify the packet, the classification comprising: determining, with a user logic unit, a newly developed protocol to which the packet is to be updated, wherein the newly developed protocol is a protocol which was not yet defined at the time the one or more processors were developed; and determining, with the user logic unit, which of a number of packet editing programs to operate on the packet to update the packet to the newly developed protocol; update, with a central editing unit, the packet, the central editing unit configured to: delete an existing header of the packet; insert a new header in the packet according to the determined packet editing program based on the classification; and modify the new header according to the determined packet editing program based on the classification.

8. The system of claim 7, wherein each packet editing program includes pointers to its editing instructions and pointers to sets of static data, shared data, and dynamic data.

9. The system of claim 8, wherein the at least one memory further includes meta data and register data accessible by the editing instructions.

10. The system of claim 7, wherein:
the at least one memory and the at least one processor reside on an application specific integrated circuit (ASIC); and
the newly developed protocol is developed after design or manufacture of the ASIC.

11. The system of claim 7, wherein determining the newly developed protocol to which the packet is to be updated comprises identifying pointers to the packet editing program to update the packet.

12. The system of claim 7, wherein deleting the existing packet header comprises deleting selected portions of the existing header that are not used by the newly developed protocol.

13. The system of claim 12, wherein inserting the new packet header comprises inserting portions of the new packet header based on the newly developed protocol and portions remaining from a previous packet header.

14. The system of claim 7, wherein modifying the new packet header comprises executing at least one of an overwrite or a read-modify-write operation.

15. The system of claim 7, wherein the at least one processor is further configured to transmit the packet including the new header through a network based on the new header.

16. A non-transitory computer-readable medium storing instructions executable by one or more processors for performing a method, the method comprising: receiving, with the one or more processors, a packet; classifying, with a user logic unit, the packet, the classification comprising: determining a newly developed protocol to which the packet is to be updated, wherein the newly developed protocol is a protocol which was not yet defined at the time the one or more processors were developed; and determining which of a number of packet editing programs to operate on the packet to update the packet to the newly developed protocol; updating, with a central editing unit, the packet, the updating comprising: deleting, with a deletion unit, an existing header of the packet; inserting, with an insertion unit, a new header in the packet according to the determined packet editing program based on the classification; and modifying, with a modification unit, the new header according to the determined packet editing program based on the classification.

17. The non-transitory computer-readable medium of claim 16, wherein determining the newly developed protocol to which the packet is to be updated comprises identifying pointers to the packet editing program to update the packet.

18. The non-transitory computer-readable medium of claim 16, wherein:
deleting the existing packet header comprises deleting selected portions of the existing header that are not used by the newly developed protocol; and
inserting the new packet header comprises inserting portions of the new packet header based on the newly developed protocol and portions remaining from a previous packet header.

19. The non-transitory computer-readable medium of claim 16, wherein modifying the new packet header comprises executing at least one of an overwrite or a read-modify-write operation.

20. The non-transitory computer-readable medium of claim 16, further comprising transmitting the packet including the new header through a network based on the new header.

21. The method of claim 1, wherein the determining which of a number of packet editing programs to operate on the packet is based on editing capabilities necessary to update the packet to the newly developed protocol.

* * * * *